H. C. ALGER.
FLUID METER.
APPLICATION FILED SEPT. 6, 1912.
1,089,101.
Patented Mar. 3, 1914.
2 SHEETS—SHEET 1.
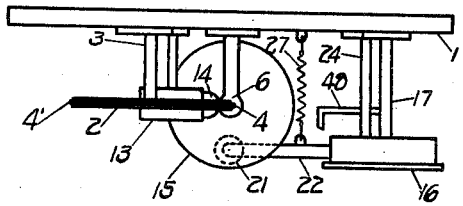
FIG. 2
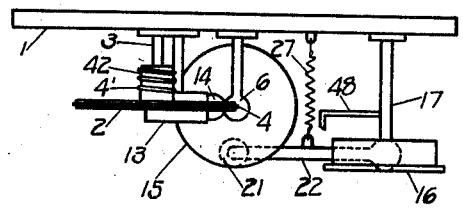
FIG. 4
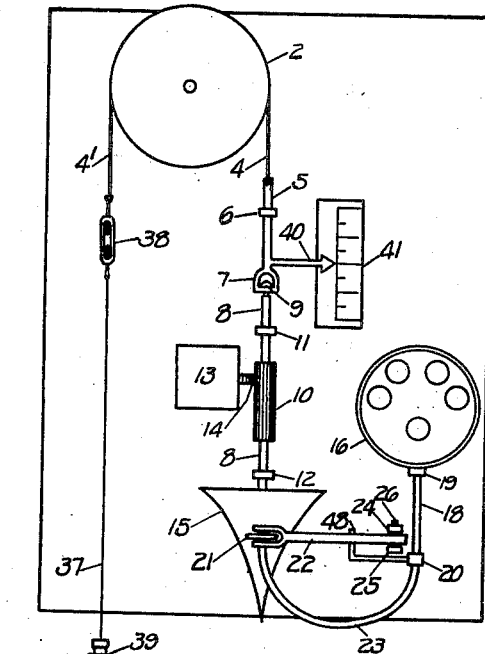
FIG. 1
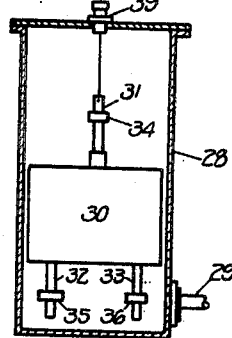
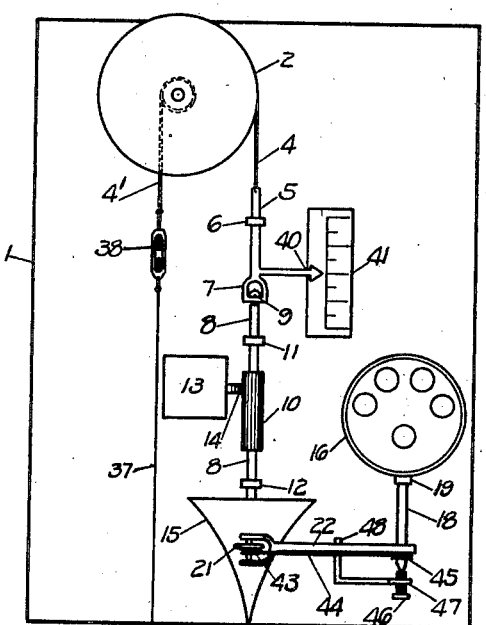
FIG. 3
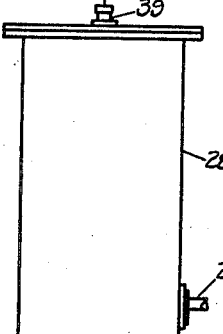
WITNESSES
James J. Hunt.
J. E. Dischinger.
INVENTOR
Harley C. Alger

H. C. ALGER.
FLUID METER.
APPLICATION FILED SEPT. 6, 1912.

1,089,101.

Patented Mar. 3, 1914.
2 SHEETS—SHEET 2.

WITNESSES

INVENTOR
Harley C. Alger

UNITED STATES PATENT OFFICE.

HARLEY C. ALGER, OF CHICAGO HEIGHTS, ILLINOIS.

FLUID-METER.

1,089,101. Specification of Letters Patent. Patented Mar. 3, 1914.

Application filed September 6, 1912. Serial No. 719,010.

*To all whom it may concern:*

Be it known that I, HARLEY C. ALGER, a citizen of the United States, residing at Chicago Heights, in the county of Cook and State of Illinois, have invented new and useful Improvements in Fluid-Meters, of which the following is a specification.

My invention relates to improvements in fluid meters wherein a stream of fluid is measured in passing over a weir or V-notch or through an orifice, Venturi tube or other suitable measuring element by operating a counter or register at a rate which is proportional to the rate at which fluid is flowing through the measuring element, one object being to provide an apparatus of this character which shall register the total amount of liquid as it passes through the measuring element, a further object is the construction of such a device which shall be accurate while at the same time simple, while a still further object is the construction of such a device so that it will indicate the rates at which liquid may be flowing.

Figure 5:
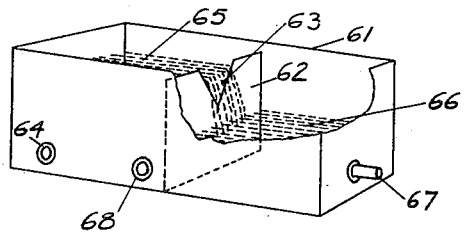
Figure 6:
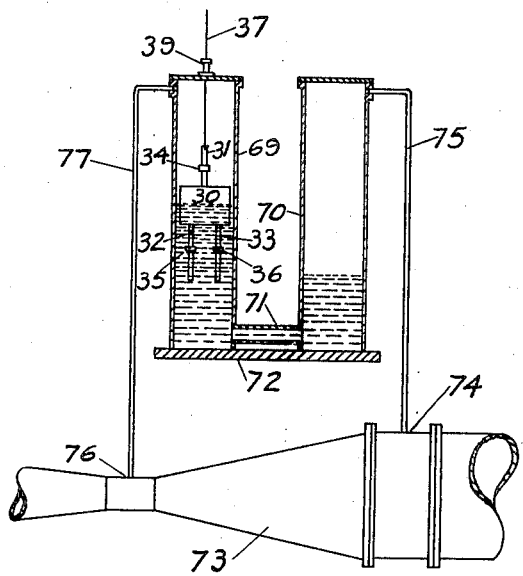

In the accompanying drawings, Figure 1 shows an elevation view of one form of my invention, Fig. 2 is a plan view of Fig. 1, Fig. 3 shows an elevation view of another form of my invention, Fig. 4 is a plan view of Fig. 3, while Figs. 5 and 6 show respectively a form of weir-box and a Venturi tube with which my invention may be used for the measurement of fluid.

Referring particularly to Figs. 1 and 2, the various parts of the mechanism may be suitably mounted on a support, 1. A sprocket or pulley, 2, rotatably mounted upon a shaft, 3, held by the support, 1, carries a cord, 4, 4'. At the end, 4, of the cord is suspended a sliding member, 5, adapted to slide longitudinally in a suitable guide, 6, secured to the support, 1. The sliding member, 5, is preferably made square or rectangular with the guide, 6, formed to match so as to prevent turning of the sliding member, 5. At the opposite end of the sliding member, 5, is formed an eye, 7, from which is suspended a shaft, 8, being supported by the eye, 7, by means of an enlargement, 9, which allows the shaft, 8, to turn without turning the sliding member, 5, or cord, 4. The shaft, 8, carries a gear, 10, which may have a relatively long face and is journaled in suitable bearings, 11 and 12, carried by the support, 1, which allow the shaft, 8, to turn freely while at the same time permitting movement in a longitudinal direction. A suitable clockwork, 13, having a gear, 14, meshing with the gear, 10, with relatively long face, is adapted to rotate the shaft, 8, while the shaft, 8, may move longitudinally. A revoluble friction member, 15, is suitably connected to the shaft, 8, so as to be revolved as the shaft, 8, revolves while at the same time being moved in another direction as the shaft, 8, is moved longitudinally. A suitable registering device, 16, which may be carried by the bracket, 17, held by the support, 1, may have an operating shaft, 18, extending therefrom, journaled in suitable bearings, 19 and 20. A second friction member or wheel, 21, carried by an arm, 22, is adapted to receive motion from the friction member, 15, and any preferred means such as a flexible shaft, 23, may be used to transmit motion from the friction wheel, 21, to the shaft, 18, which operates the register. The opposite end of the arm, 22, may be suitably pinned to bosses, 24 and 25, suitably carried by the support, 1, by means of the pin, 26, so as to allow the arm, 22, with the friction wheel, 21, to swing with the pin, 26, as a center; a spring, 27, Fig. 2, in tension, may be adapted to hold the friction wheel, 21, against the revolving friction member, 15.

As before mentioned, the cord, 4, 4', passes over the pulley, 2, and is adapted to receive motion from a float which may be actuated by the level of liquid within a weir-box or supply side of a V-notch or orifice such a weir box being shown in Fig. 5 or from a float actuated by the liquid level within a suitably arranged manometer usually used in connection with a Venturi tube for measuring the flow of fluid through the tube such an arrangement being shown in Fig. 6.

In Fig. 1, I have shown a float-pot, 28, suitably located, which communicates through the pipe, 29, with a weir-box or the supply side or a notch or orifice or an equivalent device adapted for the measurement of liquid, so that the liquid level within the float-pot is at all times the same as the liquid level in such weir-box or supply side. A float, 30, is positioned within the float-pot, 28, so as to be actuated by the level of the liquid therein; rods, 31, 32 and 33, are secured to the float and slidingly received in guides, 34, 35 and 36, respectively, the two rods, 32 and 33, being preferably secured to the float, 30, at a distance apart to prevent turning of the float and allowing free movement of the float in a vertical line. The float rod, 31, may be connected by means of a wire, 37, or other suitable connection with the cord 4' of the registering mechanism, through the medium of a suitable turn buckle, 38, which may be used for the purpose of adjusting the relative position of the suspended parts. If it is desired to have the float-pot 28, covered in order to maintain pressure or vacuum therein, the wire, 37, may pass through any suitable stuffing box, 39, which may retain the pressure or vacuum while at the same time allowing free passage of the wire, 37, as the float, 30, rises or falls.

Fig. 5 shows a weir box which may be adapted for the measurement of liquid. The box consists of a suitable shell 61 which may have a partition 62 in which partition is formed a measuring element such as a notch, a weir or an orifice which are commonly used for measuring the flow of liquid, a notch 63 being shown. Water may be delivered to the weir box through an inlet connection 64 on the supply side 65 of the notch or weir and may flow over the notch 63 into a compartment 66 from which water may be drawn through the outlet 67. The water level within the compartment 66 should be kept below the notch 63 for accurate measurement of liquid. The pipe 29 of the float pot 28 of Fig. 1, may connect to a suitable flange 68 having communication with the supply side 65 of the weir box 61 which is shown in Fig. 5 so that the water level within the float pot 28 of Fig. 1 will be the same as the water level within the supply side 65, Fig. 5.

Fig. 6 shows a method of connecting my device for use with a Venturi tube for the purpose of measuring the flow of liquid. The float 30 may be located in one side of a suitable manometer comprising two upright legs 69 and 70 which communicate at their lower extremity through a tube 71, the whole being mounted on a suitable base 72 and the manometer being partly filled with mercury or other suitable liquid. The upper extremity of the leg 70 of the manometer may communicate with a Venturi tube 73 at a point 74 on the supply side of the tube by means of a suitable pipe 75. The upper extremity of the leg 69 may communicate with the throat 76 of the Venturi tube by means of a suitable pipe 77. As the rate of flow of fluid through the Venturi tube increases the level of the mercury within the leg 69 of the manometer will rise and as the rate of flow through the Venturi tube decreases the level of liquid within the leg 69 will fall so that the float 30 rises and falls as the rate of flow increases and decreases. A wire 37 may then connect with the cord 4' of the registering mechanism.

It is to be understood that the cord, 4', may be connected to any other suitable moving element which is arranged to indicate the head of liquid flowing over a weir, notch or orifice or to indicate the difference in pressure at two points of a Venturi tube so that the cord, 4, receives motion corresponding to the rate at which fluid is flowing through the weir, notch, orifice, Venturi tube or other measuring element. The cord, 4—4', will then transmit motion through the sliding member, 5, and shaft, 8, to the friction member, 15, revolved by the clockwork, 13, and different positions of the friction member will represent the different rates of flow through the measuring element; the friction member, 15, may be so shaped that it will at all times drive the friction wheel, 21, at rates proportional to the rates at which fluid is flowing through the measuring element. If the rates of flow of liquid over a weir or through a notch, orifice or Venturi tube be plotted as ordinates on a chart with the corresponding heights of the float as abscissæ, the result will in general be a curve which may represent the curve of flow of the liquid. The shape of such curve may be either concave or convex depending upon the type or shape of the measuring element and in some cases with a properly constructed orifice may even assume a straight line. The revoluble friction member 15 is a solid of revolution generated by a curve revolved about a line, the shape of the generating curve corresponding to the so-called curve of flow and the line corresponding to the axis of the friction member, the shape of the friction member corresponds to the so-called curve of flow although it may be of different proportions due to the scale or units used in constructing the same. The friction member is then somewhat conically shaped and in some cases may even be a cone. The friction wheel, 21, may therefore, be adapted to operate the register, 16, so that it will register the amount of fluid passing through the measuring element. A pointer, 40, carried by the sliding member, 5, may be adapted to indicate upon a scale, 41, held by the support, 1, the rates at which fluid is flowing through the measuring element.

In Fig. 3, I have shown a modification of the invention in which the cord, 4, is secured to and passes over the pulley, 2, which is connected to a drum, 42, the pulley, 2, and drum, 42, being rotatably mounted on the shaft, 3. The cord, 4', may be secured to and wound around the drum, 42, so that a slight movement of the cord, 4', caused by change in the rate of flow of fluid through the measuring element, causes a greater movement of the cord, 4, thus allowing a greater longitudinal movement of the friction member, 15, which is in many cases desirable to obtain suitable proportions in the shape of the friction member, 15. In Fig. 3, I have also shown another arrangement for transmitting motion from the friction wheel, 21, to the shaft, 18, of the register, 16. The pivoted end of the arm, 22, is coincident with the axis of the shaft, 18, the pulley, 43, attached to the friction wheel, 21, being adapted to transmit motion through a belt, 44, to a pulley 45, secured to the shaft, 18. The end of the shaft, 18, may be pivoted in a center within a screw, 46, suitably secured in a boss, 47, carried by the support, 1, so that by screwing up or down with the screw, 46, the relative position of the friction wheel, 21, with respect to the friction member, 15, may be altered. This arrangement will be of further convenience in adjusting the mechanism.

As shown in the various figures, a stop, 48, may be suitably arranged so that the arm, 22, will strike the stop, 48, when the friction member, 15, is moved, so that the friction wheel, 21, reaches the apex which may be at the extremity of the friction member, 15, so that the spring, 27, will not draw the friction wheel, 21, past the axis of the friction member, 15, and so that the friction wheel, 21, will be in position to again receive motion from the friction member, 15, as the friction member, 15, moves longitudinally.

It is evident that variations may be made in the proportions and the relative positions of the various parts while the shape of the various elements may be altered without departing from the scope of my invention, I do not therefore confine myself to the exact constructions set forth.

What I claim as my invention and desire to protect by Letters Patent is:

1. In a fluid meter, a vertical cord, means whereby the vertical cord is caused to move in response to the rate of flow of fluid through the meter, a revoluble member shaped to correspond to the curve of flow of the fluid being measured, said revoluble member being suspended from the cord, means for revolving the revoluble member, a register and means for transmitting motion from the revoluble member to cause the register to operate.

2. A fluid meter comprising a measuring element, a cord, means whereby the cord is caused to move longitudinally in accordance with changes in rate of flow of the fluid passing through the measuring element, a revoluble member comprising a solid of revolution shaped to correspond to the curve of flow of the fluid being measured, said revoluble member being connected to the cord and adapted to receive motion, axially, from the cord, means for revolving the revoluble member, a register and means operated by the revoluble member to cause the register to operate.

3. A fluid meter comprising a measuring element, a sliding member, means whereby the sliding member is caused to move longitudinally in accordance with changes in rate of flow of the fluid passing through the measuring element, a revoluble member comprising a solid of revolution shaped to correspond to the curve of flow of the fluid being measured, said revoluble member being adapted to receive motion from the sliding member, means for revolving the revoluble member, a register and means operated by the revoluble member to cause the register to operate.

4. A fluid meter comprising a measuring element, a sliding member, means whereby the sliding member is caused to move longitudinally in accordance with changes in rate of flow of the fluid passing through the measuring element, a revoluble member comprising a solid of revolution shaped to correspond to the curve of flow of the fluid being measured, said revoluble member being adapted to receive motion from the sliding member, the axis of the revoluble member being substantially in line with the sliding member, means for revolving the revoluble member, a register and means operated by the revoluble member to cause the register to operate.

5. In a fluid meter, a register, a revoluble member shaped to correspond to the curve of flow of the fluid being measured, float actuated means for moving the revoluble member axially, a pivoted arm adapted to swing about an axis, substantially parallel to the axis of the revoluble member, a member rotatably mounted on the arm and adapted to receive motion from the revoluble member and means for transmitting motion from the rotatably mounted member to cause the register to operate.

6. In a fluid meter, a register, a revoluble member, a pivoted arm adapted to swing about an axis parallel to the axis of the revoluble member, a member rotatably mounted on the arm, the second mentioned member being adapted to receive motion from the first mentioned member and means for transmitting motion from the second mentioned member to cause the register to operate.

7. In a fluid meter, a revoluble driven member, a swinging arm adapted to swing about an axis substantially parallel to the axis of the revoluble driven member, a member rotatably mounted on the arm, means for moving the swinging arm to cause the rotatably mounted member to receive motion from the revoluble driven member, means for moving one of the members relative to the other, a register and means for transmitting motion from the rotatably mounted member to cause the register to operate.

HARLEY C. ALGER.

Witnesses:
I. E. DISCHINGER,
W. N. CROSS.